United States Patent [19]

Toumani

[11] Patent Number: 4,612,417
[45] Date of Patent: Sep. 16, 1986

[54] ELECTRONIC BATTERY FEED CIRCUIT FOR TELEPHONE SYSTEMS

[75] Inventor: Rouben Toumani, Randolph Township, Morris County, N.J.

[73] Assignee: AT&T Bell Laboratories, Murray Hill, N.J.

[21] Appl. No.: 635,209

[22] Filed: Jul. 27, 1984

[51] Int. Cl.[4] .......................................... H04M 19/08
[52] U.S. Cl. ................................. 179/77; 179/170 NC
[58] Field of Search ..................... 179/70, 77, 170 NC, 179/16 AA, 16 F, 18 FA

[56] References Cited

U.S. PATENT DOCUMENTS

| | | | |
|---|---|---|---|
| 4,203,009 | 5/1980 | Tattersall | 179/16 AA |
| 4,292,478 | 9/1981 | Davis et al. | 179/170 NC |
| 4,315,106 | 2/1982 | Chea, Jr. | 179/16 |
| 4,315,207 | 2/1982 | Apfel | 323/284 |
| 4,388,500 | 6/1983 | Regan | 179/170 NC |
| 4,419,542 | 12/1983 | Embree et al. | 179/77 |
| 4,431,868 | 2/1984 | Bolus et al. | 179/18 |
| 4,445,006 | 4/1984 | Scholich | 179/170 NC |
| 4,472,608 | 9/1984 | Beirne | 179/170 NC |
| 4,476,350 | 10/1984 | Aull et al. | 179/70 |
| 4,514,595 | 4/1985 | Rosenbaum et al. | 179/16 F |

OTHER PUBLICATIONS

"A High-Voltage IC for a Transformerless Trunk and Subscriber Line Interface", IEEE Journal of Solid-State Circuits, vol. SC-16, No. 4, Aug. 1981, pp. 261-266, by D. W. Aull et al.

Primary Examiner—James L. Dwyer
Attorney, Agent, or Firm—Charles Scott Phelan

[57] ABSTRACT

Resistive circuits are provided at the input of an electronic battery feed circuit feedback path for lowering the voltage level of feedback signals to a metallic signal feedback portion and a common mode signal feedback portion so a common mode amplifier can be implemented in a much lower voltage technology than line amplifiers of the battery feed circuit. Additional resistive circuits at the feedback output apply metallic signals to complementary inputs of the tip and ring line amplifiers without requiring a phase splitting amplifier. In addition, signals derived from the feedback circuit are used to vary the supply voltage for the line feed circuit elements as a function of feedback signal level and to provide a common mode reference signal which causes the tip and ring amplifiers to be biased symmetrically with respect to ground and the variable negative supply.

16 Claims, 1 Drawing Figure

ELECTRONIC BATTERY FEED CIRCUIT FOR TELEPHONE SYSTEMS

FIELD OF THE INVENTION

This invention relates to an electronic battery feed circuit for telephone systems, and it relates more particularly to an architecture for such a circuit which has advantageous initial and operating costs associated therewith.

BACKGROUND OF THE INVENTION

Electronic battery feed circuits are used in telephone systems to provide operating current to a subscriber loop, or line circuit without the need for transformers which are inconvenient to implement in semiconductor integrated circuit technology. Because electronic battery feed circuits are usually provided in telephone systems on a per-line basis, their initial cost and operating energy cost are important concerns. For example, the voltage level at which a semiconductor integrated circuit is to be operated dictates the sizes of the devices to be employed in the circuit and also their spacing with respect to one another. In that sense, the requirement for a high operating voltage usually means a significantly greater silicon chip area than would be the case for an integrated circuit that could operate at a substantially lower voltage level.

In one form of electronic battery feed circuit for telephone systems which is found in the art at the present time, tip and ring transconductance amplifiers, a common mode feedback amplifier for the tip and ring amplifiers, and a phase splitting amplifier are included in an integrated circuit chip which operates at a relatively high voltage, i.e., a voltage which corresponds to that which is required by a subscriber line which is fed by the battery feed circuit. In a typical application, for example, such amplifier elements and the subscriber line would be operated at a supply voltage of, for example, −48 volts or higher. The phase splitting amplifier receives a combined form of various feedback and transmission signals and applies the combined form in complementary phases to like inputs of the tip and ring amplifiers for controlling the amount of metallic current supplied by those amplifiers to the tip and ring wires of the customer loop. The common mode amplifier is responsive to customer loop circuit common mode voltages for providing a signal to the tip and ring amplifier inputs to control the amount of longitudinal rip and ring currents provided by these amplifiers. One example of an electronic battery feed circuit of the type just outline is to be found in a paper by D. w. Aull, D. A. Spires, P. C. Davis, and S. F. Moyer entitled "A High-Voltage IC for a Transformerless Trunk and Subscriber Line Interface" appearing in the *IEEE Journal of Solid-State Circuits*, Volume SC-16, No. 4, August, 1981, at pages 261–265.

Another telephone line current supply arrangement is shown in the U.S. Pat. No. 4,315,106 to R. C. W. Chea, Jr., and in that patent the line current supply is regulated according to subscriber line length. A relatively high impedance set of resistors is employed for sensing the line signal level. A DC-to-DC converter in a feedback path provides the line current control.

The U.S. Pat. No. 4,419,542 to M. L. Embree et al. shows an electronic battery feed circuit in which tip and ring drive circuits are controlled to supply loop current. An isolation amplifier is connected to the tip and ring conductors to monitor common mode voltages and provide a signal that is used by a drive current generator to adjust controls of the tip and ring drive circuits. The current drive generator also receives a single current summer signal which is produced in response to the tip and ring drive circuit outputs.

U.S. Pat. No. 4,431,868 to D. M. Bolus et al. teaches a telephone line interface circuit for supplying line circuit current. A pair of high voltage operational amplifiers feed the tip and ring conductors of a subscriber line circuit. Outputs of those amplifiers are coupled through various additional amplifiers to slave a dual-regulator, DC-to-DC converter. That converter supplies operating potential to the tip and ring amplifiers and to a high voltage common mode control circuit. The latter circuit is also responsive to tip and ring amplifier outputs to locate a ground voltage level between the tip and ring amplifier supply voltage rails.

SUMMARY OF THE INVENTION

An improved electronic line feed circuit for telephone systems minimizes the number of those components of the circuit that would normally be implemented in high voltage technology in the known technique of using tip and ring transconductance amplifiers which are controlled by both metallic and common mode feedback circuits. In the improved line feed circuit, common mode signals are derived at a lower voltage so that a common mode amplifier can be implemented in a substantially lower voltage technology than is required for the tip and ring amplifiers. Additional resistive circuits at the output of the metallic feedback circuit apply metallic signals to complementary inputs of the tip and ring amplifiers without requiring a separate phase splitting amplifier to be employed.

In one embodiment of the invention, signals derived from the metallic feedback circuit are used to vary the level of a supply voltage for the line feed amplifiers and to provide a variable common mode reference signal proportional to the supply voltage, which acts through the common mode amplifier to bias the tip and ring amplifier outputs symmetrically with respect to ground and the negative supply voltage, respectively.

BRIEF DESCRIPTION OF THE DRAWING

A more complete understanding of the invention and its various features, objects, and advantages may be obtained from a consideration of the following Detailed Description in connection with the appended claims and the single figure of the drawing which comprises a line feed circuit diagram partially in schematic form and partially in functional form.

DETAILED DESCRIPTION

Figure 1:
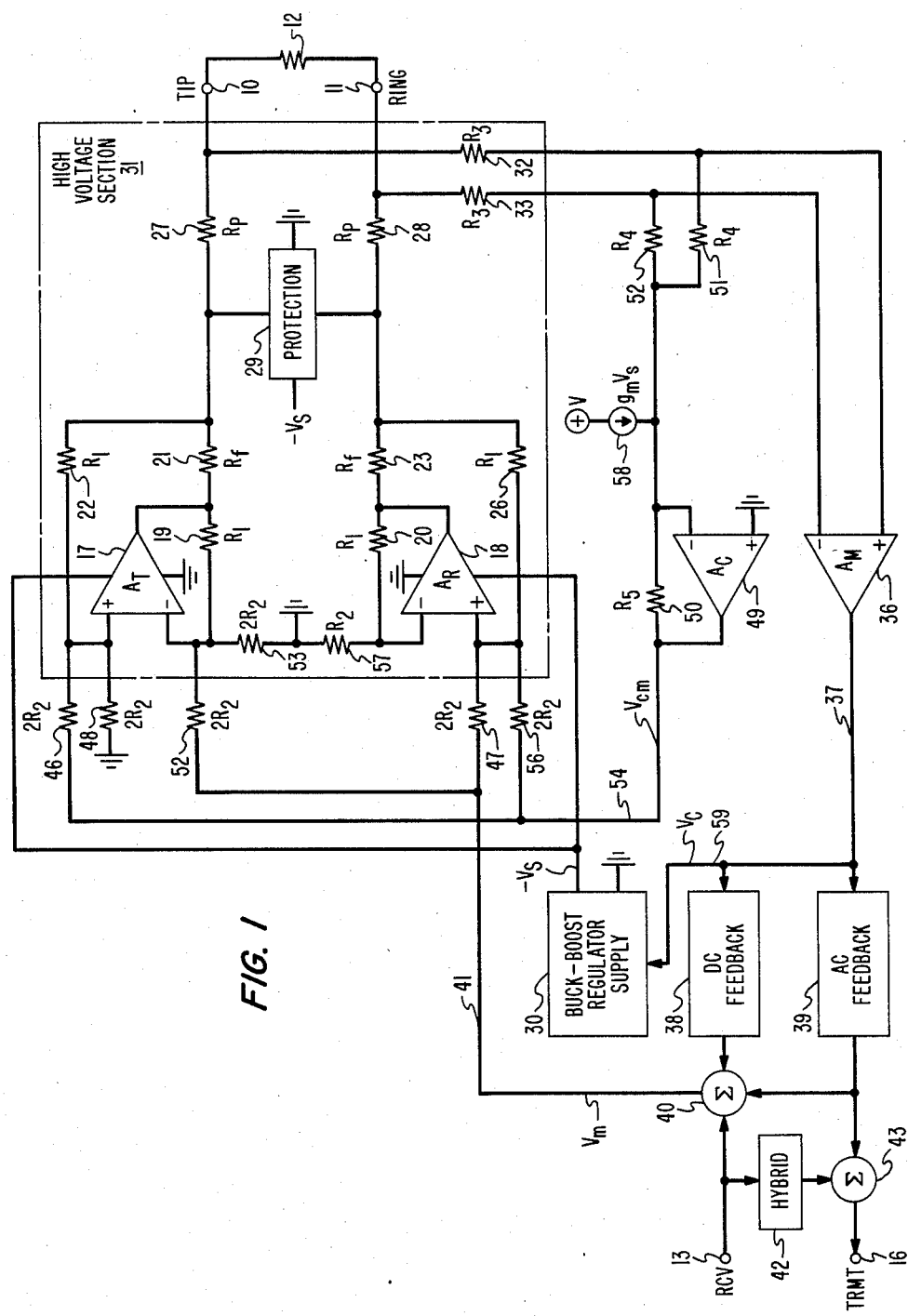

The drawing illustrates in simplified form a transformerless solid-state subscriber line interface circuit. Basic principles of solid-state line interfaces have been covered in literature such as, for example, the Aull et al. paper hereinbefore mentioned. The circuit of the drawing is simplified to deal more clearly with the improved battery feed aspect of the invention, which offers improved performance as to dissipation in the battery feed portions of the circuit and minimizes the circuit functions that need to be implemented in high voltage technology. The term "high voltage" is utilized here with reference to a voltage, such as −48 volts, which is often employed for operating telephone subscriber line circuits. That is to be distinguished from a "low voltage" technology, such as 5 volts, which is about an order of magnitude lower and is commonly employed in the present state of the art for semiconductor circuit operation. Such a difference in supply voltages allows the lower voltage technology circuits to include smaller devices more densely packed with consequent savings in semiconductor material.

The battery line feed circuits of the drawing operate between tip and ring connections 10 and 11 for a 2-wire telephone subscriber line, or loop, circuit which is schematically represented in the drawing by a load resistor 12, and a 4-wire transmission path which extends to the equipment of a telephone system central office. That transmission path is schematically represented by the connection 13 for a 2-wire receive circuit and a connection 16 for a 2-wire transmit circuit. The subscriber line is powered by two transconductance amplifiers, which are advantageously implemented using high voltage operational amplifiers 17 and 18. Those amplifiers are also otherwise designated as $A_T$ and $A_R$, and they are illustrated with their associated feedback resistors. Thus, a resistor 19 is connected directly for negative feedback from the output of amplifier 17 to its inverting input connection, and a resistor 20 is connected from the output of amplifier 18 to the inverting input of the same amplifier. A series connected combination of resistors 21 and 22 provide positive feedback from the output of amplifier 17 to its noninverting input, while a similar series combination of resistors 23 and 26 provide positive feedback from the output of amplifier 18 to its noninverting input. Resistors 19, 20, 22, and 26 are all advantageously of equal resistance; and resistors 21 and 23, each otherwise designated $R_f$, are also advantageously of equal resistance. A resistor 27 is connected between a series circuit terminal between resistors 21 and 22 on the one hand, and the tip connection 10 on the other hand, to cooperate with a protection circuit 29 for providing overvoltage protection for the battery line feed arrangement. A resistor 28 is similarly connected with respect to the ring connection 11 and the circuits of ring amplifier 18. Protection resistors 27 and 28 are otherwise each designated $R_p$.

Amplifiers 17 and 18 are powered from a negative supply rail at a voltage $-V_s$, e.g., $-48$ volts, with respect to a ground rail or reference point from a buck boost regulated supply 30. The supply 30 is advantageously a transformerless, noninverting, buck boost, switching regulator, such as is shown in my U.S. Pat. No. 4,395,675. It is well to know at this point that the amplifiers 17 and 18 are included in a high voltage integrated circuit chip which, with their associated resistors and protection circuit 29, are included in a high voltage section 31, as symbolized by the broken line enclosure for those elements in the drawing. Remaining active elements of the battery line feed circuit in the subscriber line interface, shown in the drawing, are advantageously implemented at a much lower voltage, which is suitable for integrated circuits in the present state of the art. That is, for example, a 5-volt supply voltage technology.

There are two main feedback loops provided for the battery feed circuit illustrated in the drawing, and these are coupled by way of resistors 32, 33, 51, and 52 from the tip and ring connections 10 and 11, respectively, and hence, from the outputs of amplifiers 17 and 18, respectively. The resistors 32 and 33 are each otherwise designated $R_3$, and resistors 51 and 52 are each otherwise designated $R_4$. Resistors $R_3$ and $R_4$ are large compared to $R_f$ and $R_p$ and provide sufficient voltage isolation to permit the active circuits of the beedback circuits to be implemented in low voltage technology. As will be explained later, the junction of resistors 51 and 52 is maintained at virtual ground by the operational amplifier 49. The voltages at the junction of resistors 32 and 51, as well as the junction of resistors 33 and 52 are at only a small fraction (e.g., five percent) of the tip and ring voltages by virtue of voltage dividing action. In one embodiment, each of the resistors $R_3$ was about three orders of magnitude larger than any of $R_f$ or $R_p$, e.g., 95 kilohms versus 50 ohms. One of those two feedback paths is a metallic signal feedback path in which the low voltage ends of the resistors 32 and 33 are connected to a noninverting input and an inverting input, respectively, of a metallic feedback differential amplifier 36, which is otherwise designated $A_M$. This amplifier, and other active elements illustrated in the drawing which are not included in the high voltage circuit section 31, are advantageously provided with operating potential from a low voltage source such as + and/or $-5$ volts, which is considered to be included in the schematic representations shown of those respective elements. An output of the metallic feedback amplifier 36 is provided on a single wire circuit 37 with respect to ground to inputs of a direct current feedback circuit 38 and an alternating current feedback circuit 39. The alternating current feedback circuit establishes the metallic alternating current input impedance at the tip and ring connections 10 and 11, as is well known in the art. Also, the output of the alternating current feedback circuit is connected to the transmit connection 16 through the summer 43, and provides a signal at connection 16 proportional to the received signal at tip and ring from the subscriber's telephone. The summer 43, together with hybrid network 42, provides the hybrid cancellation function, which is also well known in the literature. The direct current feedback circuit includes a nonlinear signal shaping network, as is also well known in the art, which determines the direct current feed profile, i.e., the relationship between the tip and ring voltages and the metallic loop current on the subscriber loop. Appropriate filtering is advantageously included in the feedback circuits 38 and 39 to prevent their interference with one another. Outputs of the feedback circuits 38 and 39 are coupled separately to inputs of an analog signal summer 40, and the output of that summer is applied on a single lead 41 with respect to ground to the tip and ring amplifier circuits. An additional input to the summer 40 is provided from the 2-wire receive connection 13, which is also coupled through the hybrid circuit 42 to the summer 43.

Signals on the lead 41 are otherwise designated $V_m$ to indicate that they are the metallic feedback signals from the tip and ring connections 10 and 11, as well as the metallic signal from connection 13, which is to be coupled to the tip and ring terminals 10 and 11 through the tip and ring amplifiers. These signals are applied by way of a resistor 52 to the inverting input of the tip amplifier 17 and by way of a resistor 47 to the noninverting input of the ring amplifier 18. An additional resistor 53 is connected from the inverting input of amplifier 17 to ground. Resistors 52, 47, and 53 are also further designated $2R_2$ to indicate that they have advantageously equal resistances to one another. This arrangement of the metallic feedback to the tip and ring amplifiers takes advantage of the complementary type input connections of those amplifiers and avoids the necessity for employing an additional operational amplifier for phase splitting purposes and which had heretofore been included in the high voltage portion of a battery feed circuit.

A second one of the two feedback circuits around the tip and ring amplifiers 17 and 18 is a common mode feedback circuit. This circuit includes a common mode operational amplifier 49, which is otherwise designated as the amplifier $A_c$, which has a negative feedback resistor 50 connected between its output and its inverting input connection. In addition, its noninverting input is grounded and thereby forces its inverting input to a virtual ground potential. A pair of equal-resistance resistors 51 and 52, and otherwise designated as resistors $R_4$ to indicate their equality, are connected in series between the low voltage ends of resistors 32 and 33 and have their series midpoint connected to the inverting input connection of amplifier 49. Each of the resistors 51 and 52 has a resistance which is advantageously very small compared to the resistance of one of the resistors 32 or 33. For example, the resistance of a resistor $R_4$ is illustratively about five percent of the resistance of a resistor $R_3$. Since the noninverting input of amplifier 49 is at virtual ground, the resistors 32, 51 and 33, 52 provide to amnplifier 49 a current which is a function of the average of the tip and ring voltages, whereas the signals provided to the metallic feedback amplifier 36 are representative of the difference between the voltage at the tip and ring connections 10 and 11. Output signals from common mode amplifier 49 are designated $V_{cm}$ and are applied by way of a lead 54 and a resistor 46 to a noninverting input connection of the tip amplifier 17. Similarly, the signals from lead 54 are applied by way of a resistor 56 to a noninverting input connection of the ring amplifier 18. A resistor 48 connects the noninverting input of amplifier 17 to ground, and a resistor 57 connects the inverting input of amplifier 18 to ground. Resistors 46, 48, and 56 are otherwise designated as $2R_2$ to indicate that they have resistances which are advantageously equal to one another and also equal to the resistances of each of the resistors 52, 47, and 53. Similarly, the resistor 57 is otherwise designated $R_2$ to indicate that its resistance is advantageously one-half that of the resistor 53. Thus, it can be seen that the equivalent resistance from each of the inputs of each of the amplifiers 17 and 18 to ground is equal to the resistance $R_2$.

There is another way to express the circuit relationships in the inputs to the transconductance amplifiers including operational amplifiers 17 and 18. Thus, resistance voltage dividers receive the metallic and common mode feedback signals in the transconductance amplifier inputs. The same divider, including resistors 47 and 56, receives at opposite ends the metallic feedback $V_m$ and common mode feedback $V_{cm}$; and the sum of those feedback signals appears at the divider tap connected to the noninverting input of amplifier 18. A divider including resistors 46 and 48 between lead 54 and ground receives the common mode signal $V_{cm}$ for application in divided form to the noninverting input of amplifier 17. Thus, the same Thevenin equivalent network impedance is seen looking back from like, i.e., noninverting, inputs of amplifiers 17 and 18 to the common mode feedback lead 54. A divider including resistors 52 and 53 between lead 41 and ground receives the metallic signal $V_m$ for application in divided form to the inverting input of amplifier 17. Thus, the same Thevenin equivalent network impedance is seen looking back from unlike inputs of amplifiers 17 and 18 to the metallic feedback lead 41.

It is noted here, with respect to the various resistors associated with operational transconductance amplifiers 17 and 18, that other relationships than the recited equalities are possible. It is, however, necessary that there be the following transconductance relationships: Equal transconductances for metallic signals from lead 41, by way of noninverting and inverting inputs of the amplifiers, to tip and ring connections 10 and 11; and equal transconductances for common mode signals from lead 54, by way of noninverting inputs of the amplifiers to those same connections.

An additional connection is provided to the inverting input of the common mode feedback amplifier 49, and this additional input is a reference input. It is provided from a current source $g_m \times V_s$ operating from a low voltage, e.g., +5 volts, supply and otherwise designated as current source 58. The common mode feedback through the amplifier 49 insures that the longitudinal impedance at the tip and ring connections 10 and 11 is kept low and that the sum of the tip and ring connection voltages remains equal to the supply voltage $-V_s$. If the subscriber line circuit is relatively long, its resistance is high. Consequently, the difference between the tip to ground and ring to ground voltages at the connections 10 and 11 is also large, as compared to what that difference would be on a relatively short line circuit for a subscriber located close to the terminal which includes the illustrated battery feed circuit. Hence, the tip and ring amplifiers, which must establish the tip-ring voltage, require a correspondingly high supply voltage value $-V_s$ to be able to power the loop for the long subscriber loop. On the other hand, for a short subscriber loop, the tip-ring voltage difference is smaller; and if, in that case, the $-V_s$ voltage were fixed at its high value, there would be considerable wasted voltage overhead in the tip and ring amplifiers. Therefore, there would be higher power dissipation in those amplifiers than is actually necessary for operation of the subscriber circuit.

In order to minimize that power dissipation, and to be able to power long loops for which a $-48$ volt battery supply would not be adequate, the aforementioned buck boost regulator supply 30 is employed so that the supply voltage can be varied and increased above its nominal value when that is required for long loops. Also, the supply voltage can be reduced below its nominal value for exceptionally short loops. The aforementioned reference connection, including the current source 58, to the inverting input of amplifier 49 is provided to modify the common mode feedback signal level in proportion to changes in the supply voltage $-V_s$, since only a single regulated supply 30 is included for both of the amplifiers 17 and 18. If that variable reference connection were not provided, dual supply rail regulators would be needed to realize changes in the supply voltage $-V_s$ without a loss in symmetry in the values of the overhead voltages at the tip and ring connections with respect to the positive and negative supply rails.

The current source 58 connection is utilized in conjunction with a connection 59 from the input to the DC feedback circuit 38 to the buck boost regulated supply 30 to supply a control signal $V_c$ to the supply 30 for adjusting its operation to modify the voltage level of $-V_s$ in accordance with detected differences between voltages at the tip and ring connections 10 and 11 to compensate for subscriber line circuits of different lengths. Thus, whereas the output of the DC feedback circuit 38 modifies the level of the metallic feedback signal $V_m$ to change the input to tip and ring amplifiers 17 and 18 to compensate their signal levels for different subscriber line lengths, i.e., change the loop current as a function of loop resistance, the control signal $V_c$ on lead 59 modifies the operating supply voltage $-V_s$ for the tip and ring amplifiers 17 and 18 to achieve a corresponding reduction in the dissipation in those amplifiers, and the reference current source 58 injects the $-V_s$ variations into the common mode amplifier 49 input to keep amplifiers 17 and 18 operating at levels which are symmetrically spaced from the middle of the new operating voltage range.

The foregoing can be stated another way. Regulator 30 is operated in response to feedback by way of lead 59 to maintain the magnitude of supply voltage $V_s$ at the negative supply rail, with respect to the ground reference rail, equal to the sum of an overhead voltage and the voltage difference between tip and ring connections 10 and 11. In addition, however, the common mode reference signal supplied by current source 58, having an output varying as a function of the magnitude of $V_s$, maintains the sum of the tip and ring connection voltages equal to the value of the negative supply voltage. That means that the line feed circuit operates with the tip and ring voltages approximately equally displaced (by one-half of the overhead voltage) from the reference and negative supply rails, respectively, even though the magnitude of the negative rail voltage $-V_s$ is changing as mentioned. In the illustrative embodiment of the invention, the centering of the line feed circuit operation is facilitated by the fact that the sum of resistances of one resistor $R_3$ and one resistor $R_4$ is made equal to the reciprocal of the transconductance $g_m$.

Although the invention has been described in connection with a particular embodiment thereof, it is to be understood that additional applications, embodiments, and modifications, which will be apparent to those skilled in the art, are included within the spirit and scope of the invention.

What is claimed is:

1. An electronic battery feed circuit comprising
    tip and ring amplifiers for sourcing and sinking current for respective conductors of a telephone subscriber line, each amplifier having complementary inverting and noninverting types of input connections, and
    a feedback circuit for both common mode and metallic signals extending from signal output connections of said amplifiers to signal input connections thereof, said feedback circuit comprising
        means in an input of said feedback circuit for reducing both common mode and metallic signal voltages coupled thereto from said output connections,
        a common mode amplifier having an input coupled to receive common mode signals at a low-voltage end of said reducing means and an output coupled to an input of each of said tip amplifier and said ring amplifier, such inputs being of the same one of said types, and
        means, in an output of said feedback circuit, for coupling metallic feedback signals to an input of each of said amplifiers, such inputs being of complementary types.

2. The electronic battery feed circuit in accordance with claim 1 in which said voltage reducing means comprises
    resistive means connected between said tip and ring amplifier outputs and an input of said common mode amplifier.

3. The electronic battery feed circuit in accordance with claim 2 in which said resistive means comprises
    first and second resistors each connected at one end to a circuit point between an output of one of said tip and ring amplifiers and a corresponding conductor of said line,
    third and fourth resistors connected in series between ends of said first and second resistors remote from said tip and ring amplifiers, and
    means for connecting a series circuit point between said third and fourth resistors to said input of said common mode amplifier.

4. The electronic battery feed circuit in accordance with claim 3 in which
    said feedback circuit includes a metallic signal feedback amplifier,
    means connected to said common mode amplifier for establishing said series circuit point as a virtual ground, and
    means for connecting said remote ends of said first and second resistors to an input of said metallic feedback amplifier.

5. An electronic battery feed circuit comprising
    tip and ring amplifiers for sourcing and sinking current for respective conductors of a telephone subscriber line, each amplifier having complementary inverting noninverting types of input connections,
    a feedback circuit extending from signal output connections of said amplifiers to signal input connections thereof, said feedback circuit comprising
        means in an input of said feedback circuit for reducing voltages coupled thereto from said output connections,
        a common mode amplifier having an input coupled to receive signals at a low-voltage end of said reducing means and an output coupled to an input of each of said tip amplifier and said ring amplifier, such inputs being of the same one of said types, and
        means, in an output of said feedback circuit, for coupling metallic feedback signals to an input of each of said amplifiers, such inputs being of complementary types,
    means for adjustably regulating a supply voltage,
    means for supplying an output of said regulating means to said tip and ring amplifiers as operating potential therefor, and
    means, responsive to changes in signal level in said feedback circuit, for adjusting operation of said regulating means to control the output of said regulating means to maintain the magnitude of such output substantially the same as the sum of a predetermined overhead voltage and voltage at said feedback circuit input.

6. The electronic battery feed circuit in accordance with claim 5 in which there are provided
    means, responsive to an output of said regulating means, for supplying a current input, in combination with said signals at said low-voltage end of said reducing means, to said common mode amplifier.

7. An electronic battery feed circuit having tip and ring line amplifiers and a feedback circuit from outputs to inputs of said amplifiers, said battery feed circuit comprising means for adjustably regulating a supply voltage,
   means for supplying an output of said regulating means to said tip and ring amplifiers as operating supply voltage therefor, and
   means, responsive to changes in signal level in said feedback circuit, for adjusting operation of said regulating means to control said output of said regulating means in a direction tending to track said changes.

8. The electronic battery feed circuit in accordance with claim 7 in which said amplifiers each has complementary, inverting and noninverting, types of input connections,
   said feedback circuit includes means, responsive to signals in an input of said feedback circuit, for applying corresponding signals to an input of each of said tip and ring amplifiers, such inputs being of like types
   means, responsive to an output of said regulating means, are provided for producing a reference signal, and
   means are provided for increasing or decreasing said corresponding signals depending upon whether said signals at said input of said feedback circuit are larger or smaller than said reference signal.

9. The electronic battery feed circuit in accordance with claim 7 in which said feedback circuit includes both a metallic signal feedback circuit and a common mode signal feedback circuit, and
   said adjusting means comprises
      means, responsive to said signal level in said metallic feedback circuit, for controlling said output of said regulating means, and
      means in said common mode signal feedback circuit for fixing the sum of voltages of outputs of said tip and ring line amplifiers to be approximately equal to said regulated supply voltage.

10. The electronic battery feed circuit in accordance with claim 7 in which said amplifiers each has complementary inverting and noninverting types of input connections,
    said feedback circuit has separate ground-reference outputs for metallic signals and for common mode signals, and
    means are provided in inputs of said amplifiers for connecting said common mode feedback signals through separate resistances at an input of each of said amplifiers, respectively, the last-mentioned inputs being of like ones of said types, and for connecting said metallic feedback signals through separate resistances at an input of each of said amplifiers, respectively, the last-mentioned inputs being of unlike ones of said types.

11. The electronic battery feed circuit in accordance with claim 7 in which said feedback circuit has separate ground-referenced outputs for metallic signals and for common mode signals,
    said amplifiers each comprises an operational amplifier having complementary inverting type and noninverting type input connections and resistance means for receiving signals at such input connections from said feedback circuit, and
    said resistance means comprises
       a first resistance voltage divider connected for receiving both said metallic and said common mode signals to one input of one of said tip and ring amplifiers,
       a second resistance voltage divider connected for receiving said common mode signals to an input, of a type like the type of said one input, of another of said tip and ring amplifiers,
       a third resistance voltage divider connected for receiving said metallic signals to an input, of a type unlike the type of said one input, of said another of said tip and ring amplifiers,
       all of said voltage dividers have resistances thereof proportioned so that the same Thevenin equivalent network impedance is seen looking back from said one input of said one amplifier and said like-type input of said another amplifier toward said feedback circuit common mode signal output, and so that the same Thevenin equivalent network impedance is seen looking back from said one input of said one amplifier and said unlike-type input of said another amplifier toward said feedback circuit metallic signal output, and
       further resistance means, including said separate resistances, connected to inputs of said tip and ring amplifiers and proportioned so all of said inputs of said tip and ring amplifiers have equal equivalents resistances to ground looking back into circuits connected to such inputs, respectively.

12. An electronic battery feed circuit having tip and ring line amplifiers and comprising means for adjustably regulating a voltage at one terminal of a supply having its other terminal connected to a predetermined reference voltage point,
    means for supplying an output of said regulating means at said one terminal to said amplifiers, which amplifiers are also connected to said reference terminal, and
    means, responsive to the regulated voltage at said one terminal, for biasing the output operating voltage points of said amplifiers to hold said operating points approximately symmetrically spaced with respect to a voltage midway between voltages of said terminals.

13. The electronic battery feed circuit in accordance with claim 7 in which said feedback circuit has separate ground-referenced outputs for metallic signals and for common mode signals,
    said amplifiers each comprises an operational amplifier having complementary, inverting type and noninverting type, input connections and resistance means for receiving signals at such input connections from said feedback circuit, and
    said resistance means comprises
       a first resistance voltage divider connected for receiving both said metallic and said common mode signals to one input of one of said amplifiers,
       a second resistance voltage divider connected for receiving said common mode signals to an input, of a type like the type of said one input, of another of said amplifiers,
       a third resistance voltage divider connected for receiving said metallic signals to an input, of a type unlike the type of said one input, of said another of said amplifiers, and means, including said first, second, and third resistance voltage dividers, connected to inputs of said amplifiers and proportioned with respect to grains of said tip and ring line amplifiers to make transconductances for metallic signals from said metallic signal output, by way of an inverting input and a noninverting input of said amplifiers, respectively, to outputs of said amplifiers substantially equal to each other, and to make transconductances for common mode signals from said common mode signal output, by way of said noninverting inputs of said amplifiers, respectively, to outputs of said amplifiers substantially equal to each other.

14. An electronic battery feed circuit comprising tip and ring amplifiers for sourcing and sinking current for respective conductors of a telephone subscriber line, each amplifier having complementary, inverting and noninverting, types of input connections, and a feedback circuit extending from signal output connections of said amplifiers to signal input connections thereof, said feedback circuit comprising a common mode amplifier having an input coupled to receive common mode signals from said output connections and an output coupled to an input of each of said tip amplifier and said ring amplifier, such tip and ring amplifier inputs being of the same type and which same type is the same as one of said complementary types, means for establishing said common mode amplifier input at a virtual ground potential, and means, in an output of said feedback circuit, for coupling metallic feedback signals to an input of each of said tip amplifier and said ring amplifier, such amplifier inputs being of complementary types with respect to one another.

15. The electronic battery feed circuit in accordance with claim 14 in which there are provided means for adjustably regulating a supply voltage with respect to a reference, means for supplying an output of said regulating means to said tip and ring amplifiers as operating voltage therefor, means, responsive to changes in signal level in said feedback circuit, for adjusting operating of said regulating means to control said output of said regulating means to maintain a predetermined linear relationship between said supply voltage and said changes, said establishing means comprising means for current biasing said common mode amplifier input with a current equal to the product of said output of said regulating means and a predetermined transconductance selected so that output operating voltage points for said tip and ring amplifiers are at voltages substantially equally separated from, and on opposite sides of, a voltage midway between said supply voltage and said reference.

16. The battery feed circuit in accordance with claim 15 in which said feedback circuit includes first and second resistance means connected in series between outputs of said tip and ring amplifiers, and means for connecting a series circuit point between said first and second resistance means to said input of said common mode amplifier, and said establishing means comprises means for biasing said input of said common mode amplifier with a current equal to the product of said operating voltage and a transconductance approximately equal to the reciprocal of the resistance of one of said first and second resistance means.

* * * * *